(12) United States Patent
Kuhn et al.

(10) Patent No.: US 6,341,264 B1
(45) Date of Patent: Jan. 22, 2002

(54) ADAPTATION SYSTEM AND METHOD FOR E-COMMERCE AND V-COMMERCE APPLICATIONS

(75) Inventors: Roland Kuhn; Jean-Claude Junqua, both of Santa Barbara, CA (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/258,113

(22) Filed: Feb. 25, 1999

(51) Int. Cl.[7] .............................................. G10L 15/28
(52) U.S. Cl. ...................... 704/255; 704/256; 704/258; 704/236; 707/505; 705/54; 705/80; 705/26
(58) Field of Search ................................ 704/247, 256, 704/272, 273, 255, 200, 236, 219, 258, 241, 266, 251; 705/2, 5, 54, 80, 26; 707/505; 709/218

(56) References Cited

PUBLICATIONS

Jean–Luc Gauvain and Chin–Hui Lee, *Maximum a Posteriori Estimation for Multivariate Gaussian Mixture Observations of Markov Chains*, IEEE Transactions on Speech and Audio Processing, vol. 2, No. 2, Apr. 1994, pp. 291–298.

I.T. Jolliffe, *Principle Component Analysis*, Springer–Verlag, New York, 1986, pp. 1–63.

C.J. Leggetter and P.C. Woodland, *Maximum likelihood linear regression for speaker adaptation of continuous density hidden Markov models*, Computer Speech and Language, V. 9, 1995, pp. 171–185.

Masahiro Tonomura et al., *Speaker adaptation based on transfer vector field smoothing using maximum a posteriori probability estimation*, Computer Speech and Language, V. 10, No. 2, Apr. 1996, pp. 117–132.

*Primary Examiner*—Tālivaldis Ivars Šmits
*Assistant Examiner*—Vijay B Chawan
(74) *Attorney, Agent, or Firm*—Harness, Dickey & Pierce, P.L.C.

(57) ABSTRACT

Electronic commerce (E-commerce) and Voice commerce (V-commerce) proceeds by having the user speak into the system. The user's speech is converted by speech recognizer into a form required by the transaction processor that effects the electronic commerce operation. A dimensionality reduction processor converts the user's input speech into a reduced dimensionality set of values termed eigenvoice parameters. These parameters are compared with a set of previously stored eigenvoice parameters representing a speaker population (the eigenspace representing speaker space) and the comparison is used by the speech model adaptation system to rapidly adapt the speech recognizer to the user's speech characteristics. The user's eigenvoice parameters are also stored for subsequent use by the speaker verification and speaker identification modules.

16 Claims, 7 Drawing Sheets

ADAPTATION SYSTEM AND METHOD FOR
E-COMMERCE AND V-COMMERCE
APPLICATIONS

BACKGROUND AND SUMMERY OF THE
INVENTION

The present invention relates generally to speech recognition systems for electronic commerce (E-commerce) and voice commerce (V-commerce). More particularly, the invention relates to a speech model adaptation system based on a reduced dimensionality representation of a speaker population. The adaptation system adapts to a new user's speech very rapidly in an unsupervised mode, and provides speaker identification and speaker verification functions as a byproduct.

Electronic commerce promises to change the way goods and services will be sold in the decades to come. Currently, electronic commerce is conducted over the Internet using personal computers connected through an Internet service provider to the Internet, where a wide variety of different commerce opportunities are made available. Using suitable browser software, the user communicates with an E-commerce server or host computer to obtain information about products and services or to engage in a commercial transaction.

E-commerce raises a number of important issues. High on the list is security. The E-commerce system must ensure within reasonably practicable limits that the party contacting the E-commerce server is who he or she says. Current technology relies heavily on keyboard-entered user I.D. and password information for user verification.

Although great strides have been made in improving the personal computers and Web browsers so that they are easier for the average consumer to use, there still remains much room for improvement. For example, many users would prefer a speech-enabled interface that would allow them to interact with the server by speaking. This has not heretofore been practical for a number of reasons.

First, speech recognizers can require a great deal of training by an individual user prior to use. This training process is called speaker adaptation. For E-commerce and V-commerce applications, speaker adaptation is a significant problem because spoken interactions are unsupervised (the server does not know in advance what the speaker will say next) and the spoken transaction is typically quite short, yielding very little adaptation data to work with.

Second, even if it were possible to perform adequate speaker adaptation with a small amount of adaptation data, the system still needs to store the adapted speech models for that user, in order to take advantage of them the next time the user accesses the system. In a server-based application that will be used by many users, it is thus necessary to store adapted models for all users. Current technology makes this quite difficult because the speech models are typically quite large. The large size of a speech model carries two costs: a great deal of storage space is required if these models are to be stored at the server, and an unacceptably long data transmission time may be required if these models must be shipped between client and server.

In addition to the foregoing difficulties with current recognition technology, voice commerce or V-commerce carries another difficulty: speaker verification. Whereas keyboard-entered user I.D's and passwords can be used to offer some level of security in conventional E-commerce transactions, V-commerce transactions are another matter. Although a system could be developed to use conventional user I.D. and passwords, these present potential security risks due to the possibility of the voice transaction being overheard.

The present invention addresses all of the foregoing problems through a system and method that carries out automatic speech model adaptation while the transaction is being processed. The system relies upon a dimensionality reduction technique that we have developed to represent speaker populations as reduced-dimensionality parameters that we call eigenvoice parameters.

When the user interacts with the system by speaking, speech models of that user's speech are constructed and then processed by dimensionality reduction to generate a set of eigenvoice parameters. These parameters may be placed or projected into the eigenspace defined by the speaker population at large. From this placement or projection, the system rapidly develops a set of adapted speech models for that user. Although the speech models, themselves, may be fairly large, the eigenvoice parameters may be expressed as only a few dozen floating point numbers. These eigenvoice parameters may be readily stored as a member of a record associated with that user for recall and use in a subsequent transaction.

The reduced dimensionality parameters (eigenvoice parameters) represent the user, as a unique speaker, and not merely as a set of speech models. Thus, these parameters may serve as a "fingerprint" of that speaker for speaker verification and speaker identification purposes. Each time the user accesses the system, the system computes reduced dimensionality parameters based on the user's input speech. These parameters are compared with those previously stored and may be used to verify the speaker's authenticity. Alternatively, the system may compare the newly calculated parameters with those already on file to ascertain the identity of the speaker even if he or she has not otherwise provided that information.

The system and method of the invention thus opens many doors for E-commerce and V-commerce opportunities. For a more complete understanding of the invention, its objects and advantages, refer to the following specification and to the accompanying drawings.

DESCRIPTION OF THE PREFERRED
EMBODIMENT

Figure 1:
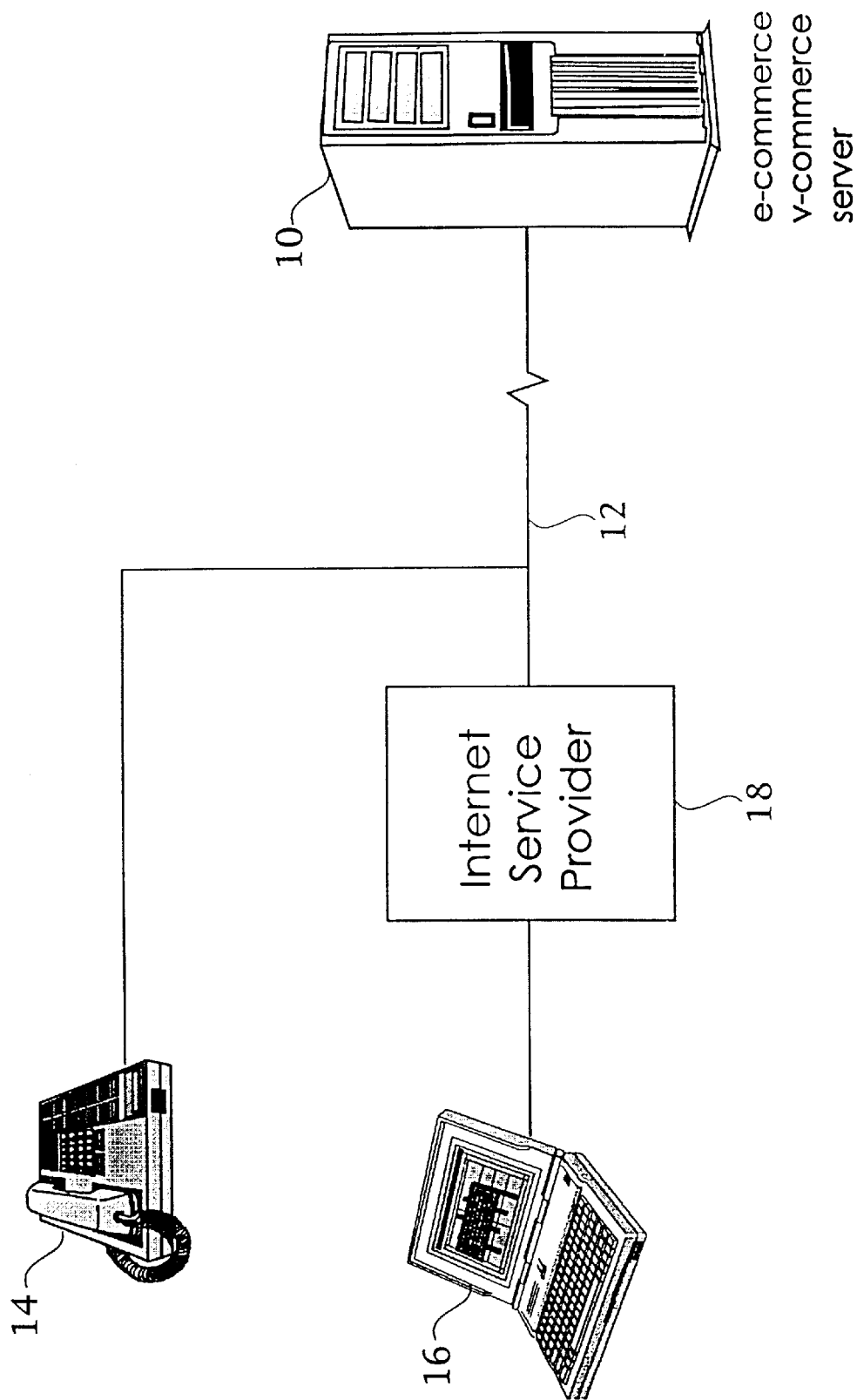
FIG. 1 is a system block diagram illustrating an exemplary telecommunications networked system for implementing E-commerce and V-commerce applications using the invention.

FIG. 1 illustrates several different server-based E-commerce and V-commerce applications in which the system of the invention can be implemented. The server 10, hosting the E-commerce or V-commerce application, is coupled to the telecommunications network 12 to support Internet traffic, voice traffic, or both. In the typical E-commerce or V-commerce application, a large number of users interact with server 10, typically generating high volume, short-term interaction. The users can be physically located anywhere throughout the world in which a suitable telecommunications connection can be made.

Illustrated in FIG. 1, a first user may be connected to the system by telephone 14. This user communicates with server 10 through spoken interaction. Server 10 includes speech recognizer and speech synthesizer for this purpose, as will be discussed more fully in connection with FIG. 2.

A second user communicates with server 10 using a personal computer, such as laptop computer 16. Computer 16 is connected to an Internet service provider 18 which routes Internet communications from the user's computer 16 over the Internet to server 10. Computer 16 may be provided with a suitable Web browser through which the user communicates by either keyboard entry or pointing device (track pad, track ball, mouse). Interaction through the Web browser is thus a form of E-commerce, in which the user requests information from server 10 and then places orders for products or services in response to the requested information.

If desired, computer 16 can be outfitted with suitable microphone and audio signal processing components to allow speech-based communications to be sent over the Internet. Such an embodiment would constitute a form of V-commerce, in which the user's spoken requests for information are digitized and sent as packets of information over the Internet to server 10. The speech recognizer within server 10 converts the digitized speech into alphanumeric text or other suitable form for further processing by the transaction processor of host 10.

The adaptation and speaker verification system of the present invention is preferably installed on server 10, where it can mediate speech-based transactions between users and the E-commerce or V-commerce application running on the host system.

Figure 2:
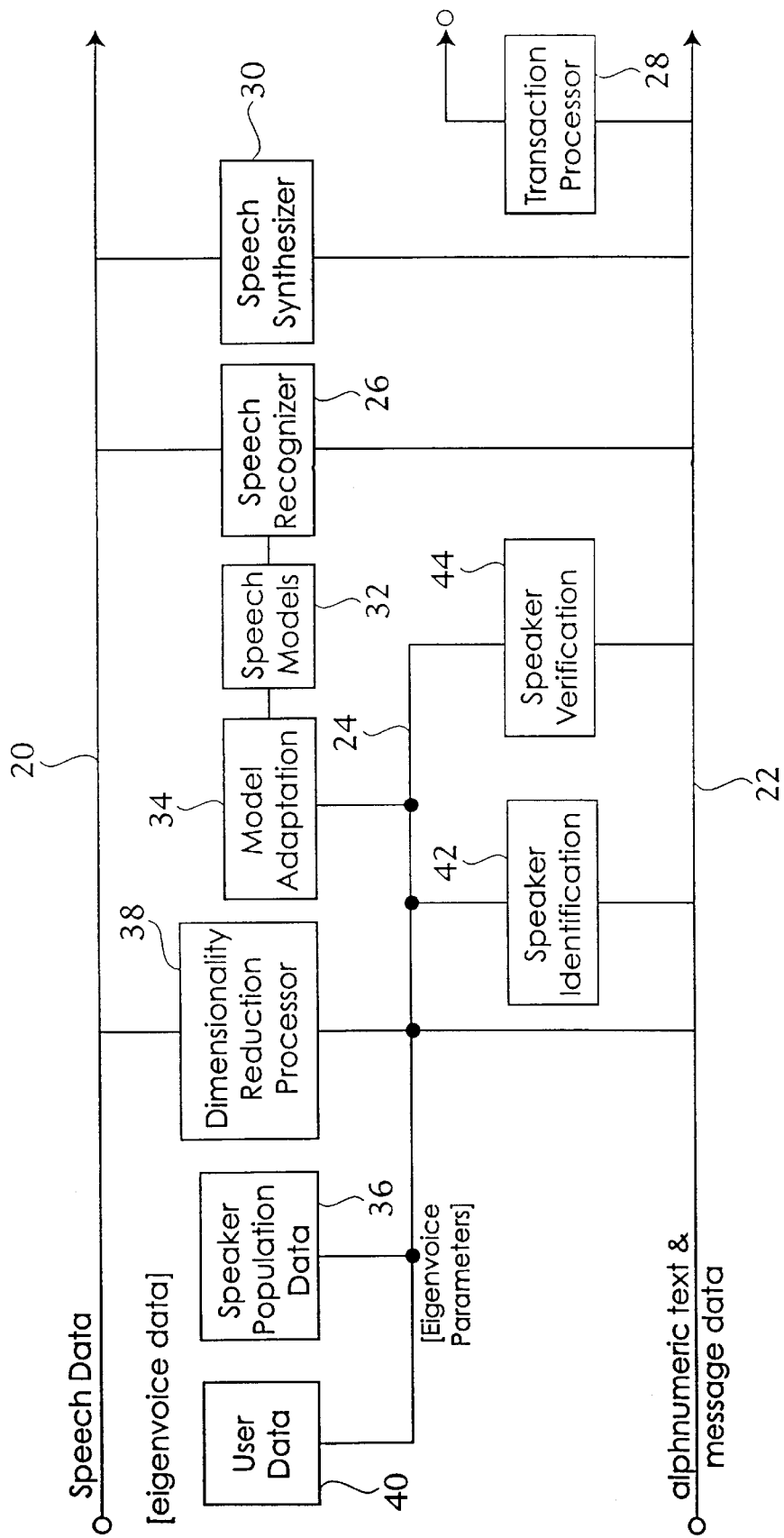
FIG. 2 is a system block diagram of a preferred embodiment of the system of the invention.

FIG. 2 illustrates a presently preferred embodiment of the adaptation and verification system. It will be appreciated that the illustrated embodiment represents one way of implementing a system using the inventive methods described herein. Other system configurations are possible.

The system works with different types of data: speech data, alphanumeric text or system message data, and eigenvoice parameters. Accordingly, FIG. 2 is laid out to show how these different data types flow as information among the various software components or modules that make up the system. Digitized audio speech data is present within the system on bus 20. Alphanumeric text and inter-module messages are passed on bus 22. Eigenvoice parameters are present on bus 24. In this regard, although FIG. 2 has been drawn as a circuit diagram with busses to shown data flow, the system of the invention may be implemented in software. In such case, the implementation of data flow paths, shown diagrammatically as busses in FIG. 2, would be implemented using suitable data structures stored in memory.

An important component of the system is speech recognizer 26. Speech recognizer 26 receives speech data as its input and converts that data into alphanumeric text, which is supplied as output to bus 22. The output of speech recognizer 26 may thus serve to express the user's commands which are fed to the transaction processor 28. The transaction processor handles the logical steps involved in consummating the E-commerce or V-commerce transaction. To allow the transaction processor to hold a dialogue with the user, speech synthesizer 30 is provided. Alphanumeric text or messages may be sent by transaction processor 28 to speech synthesizer 30, which in turn generates synthesized speech that is placed on the speech data bus 20.

The speech recognizer 26 is preferably of a type that is based on a set of trained speech models. FIG. 2 illustrates such speech models at 32. Many speech recognizers in popular use today use Hidden Markov Models (HMM) and such recognizers may be used to implement the present invention. Other model-based recognizers may also be used, however.

The speech models 32 are trained prior to placing the system in service for use. Typically, a good cross-section of the expected speaker population is assembled, and speech from that population is labeled and then used to train the speech models. Because the system must be designed to work reasonably well with any user who may later access the system, the speech models 32 are preferably designed as speaker independent models. These speaker independent models are then adapted to the individual user's speech through the services offered by the present invention.

To effect speech model adaptation, the system employs a model adaptation module 34. Unlike conventional adaptation techniques, the model adaptation module 34 uses a unique dimensionality reduction technique, which we call the eigenvoice technique, to perform adaptation very rapidly, after only a minimal amount of speech has been provided by the user. The eigenvoice technique centers around a reduced dimensionality representation of an entire speaker population, taking on a representation that we call eigenvectors. These eigenvectors define an eigenspace that is constructed before the system is placed in service. These speaker population data are stored in data store 36.

Although the speaker independent speech models 32 and the speaker population data 36 are both generated and stored before the system is placed in service, these two sets of data should not be confused with one another. The speech models 32 represent all of the words or other symbols that the speech recognizer can recognize. This collection of words is stored in a dictionary or lexicon.

In contrast, the speaker population data represent human speakers. The eigenspace is trained upon a corpus of human speakers through a dimensionality reduction process (more fully described below) that extracts a relatively small number of parameters upon which human speech characteristics may be distinguished. Although the presently preferred dimensionality reduction process does not have the explicit task of subdividing all speakers along a male-female dimension, such subdivision is exemplary of the type of discrimination that each dimension of the eigenspace provides.

The model adaptation module 34 adapts speech models 32 to a given user by employing the services of the dimensionality reduction processor 38. When new speech data is provided by the user, the dimensionality reduction processor operates upon that speech data to generate eigenvoice parameters, using the same procedure that is used to generate the speaker population data 36. The model adaptation module 34 then places or projects the new speaker eigenvoice parameters into the speaker population eigenspace to, in effect, determine where within the speaker population this particular user's speech falls. The procedures for accomplishing this are described more fully below.

Once the new speaker's eigenvoice parameters have been placed or projected into the eigenspace of the speaker population at large, the model adaptation module 34 determines, through a suitable distance measure, which combination of traits found in the training speakers the new speaker most resembles. With this information, module 34 can very rapidly adjust speech models 32 in the direction of that combination of traits.

Although the speech models, themselves, typically comprise vast amounts of data—costly to store and transport— the eigenvoice parameters are quite terse. Eigenvoice parameters may be stored as floating point numbers, with a typical embodiment using approximately 40–50 eigenvoice parameters to define the entire Eigenspace. Therein lies one of the distinct advantages of the present invention.

Once eigenvoice parameters have been calculated for the new user they may be stored as user data in data store 40. The task of storing 40–50 floating point numbers for each user of the system is quite feasible, even in systems intended for thousands or even millions of users. When a previous user of the system accesses it again, that user's eigenvoice parameters are fetched from data store 40 and used by the model adaptation module 34 to instantly adapt the speech models 32 to that user. If desired, further model adaptation can be effected each time a user accesses the system, however this is not ordinarily required.

In the illustrated embodiment, the user data store 40 is hosted by server 10. In this embodiment, eigenvoice parameters for all users are stored in a central location, under control of the host processor that performs the other functions illustrated by modules in FIG. 2. Alternatively, the eigenvoice parameters for individual users may be stored in a distributed fashion. By way of example, referring to FIG. 1, the eigenvoice parameters for an individual user may be stored on that user's personal computer (such as computer 16). In such an embodiment, the dimensionality reduction processor 38 generates eigenvoice parameters based on speech data supplied by the user, and these eigenvoice parameters are then transmitted back to the user as alphanumeric text or other suitable data format for storage on the user's local hard drive. In Internet Web browser implementations, the eigenvoice data may be transmitted for storage on the user's hard drive as a cookie. When the user makes subsequent access to the system, the eigenvoice parameters stored in this cookie are sent back to the host, where the model adaptation module 34 may use them to adjust the speech models.

The stored user eigenvoice parameters have other important uses in addition to model adaptation. The parameters may be used for speaker identification and speaker verification. The speaker identification module 42 and speaker verification module 44 both receive eigenvoice parameters from the eigenvoice parameter bus 24. As will be more fully explained below, speaker identification is performed by comparing the eigenvoice parameters generated by processor 38 with the entire database of user data within data store 40. The identification module 42 matches the newly generated user's parameters with the parameters previously stored for that user, thereby determining the identity of the user. This identity information may be sent as alphanumeric text or message data to the transaction processor 28.

The speaker verification module 44 operates in a slightly different manner. In this case, the users proported identity is supplied as alphanumeric text, either through keyboard entry or from speech recognizer 26. The speaker verification module 44 accesses the user data store 40 to obtain the previously stored eigenvoice parameters for the identified speaker. Meanwhile, the dimensionality reduction processor 38 generates new eigenvoice parameters based on current speech data supplied by the user. The speaker verification module 44 compares the new parameters with the previously stored parameters to ascertain whether the parameters are sufficiently similar to verify the speaker's identity. Module 44 then supplies alphanumeric text or message data to the transaction processor, notifying it that the incoming speech is either authentic or from an imposter.

The system and method for adapting speech models and performing speaker identification and speaker verification may be used in a variety of different of E-commerce and V-commerce applications. Although telephone-based and Internet-based applications have been illustrated here, uses of the system are not limited to these applications. For example, the system may be used in vending machine systems, such as bank cash machines, airport ticketing systems, and the like.

DETAILED OF EIGENVOICE DIMENSIONALITY REDUCTION TECHNIQUE

To better understand the speaker adaptation technique of the invention, a basic understanding of the speech recognition system will be helpful. Most present day speech recognizers employ Hidden Markov Models (HMMs) to represent speech. The Hidden Markov Model is a modeling approach involving state diagrams. Any speech unit (such as a phrase, word, subword, phoneme or the like) can be modeled, with all knowledge sources included in that model. The HMM represents an unknown process that produces a sequence of observable outputs at discrete intervals, the outputs being members of some finite alphabet (corresponding to the predefined set of speech units). These models are called "hidden" because the state sequence that produced the observable output is not known.

Figure 3:
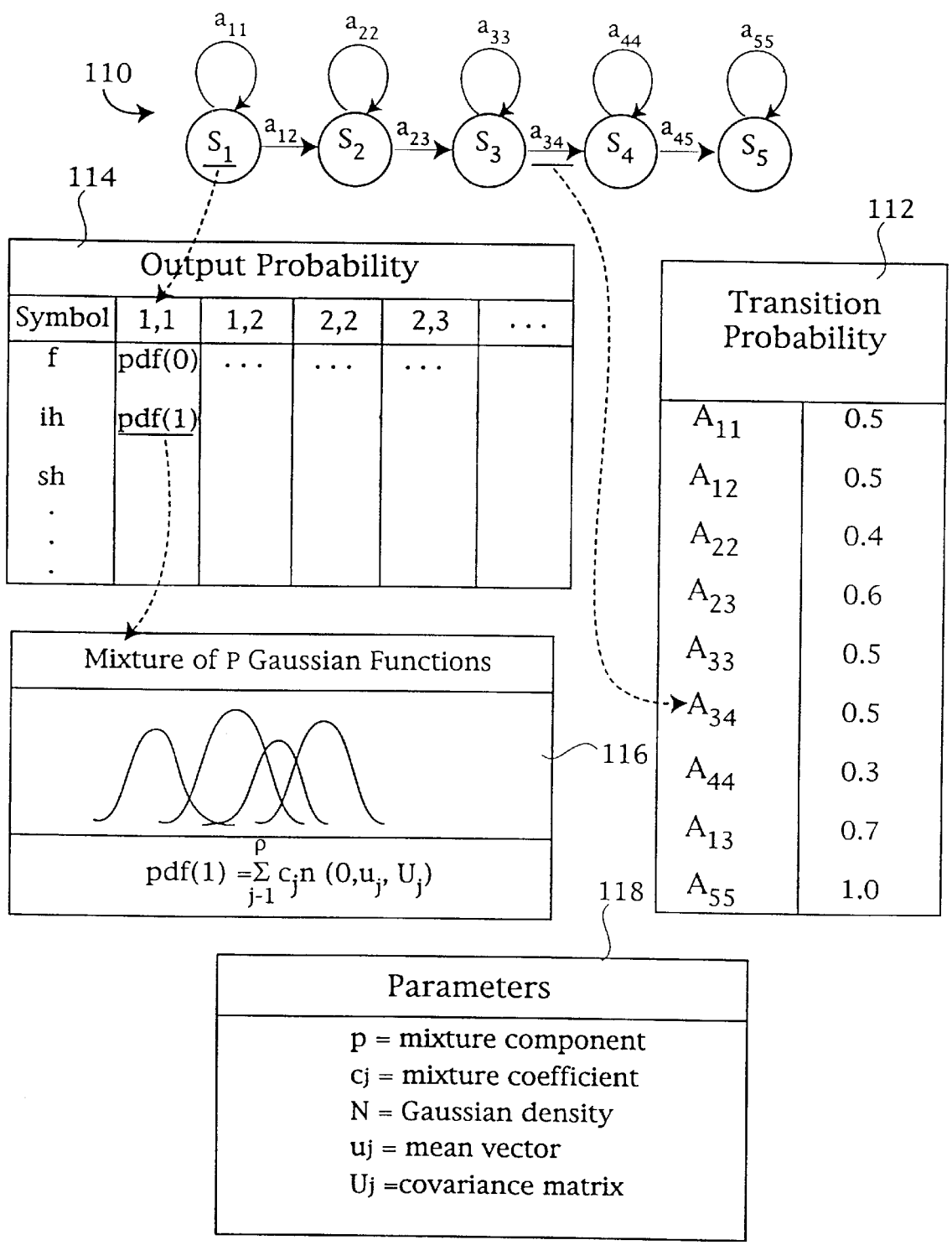
FIG. 3 illustrates an exemplary Hidden Markov Model (HMM), useful in understanding the invention.

As illustrated in FIG. 3, an HMM 100 is illustrated by a set of states (S1, S2 . . . S5), vectors that define transitions between certain pairs of states, illustrated as arrows in FIG. 3, and a collection of probability data. Specifically, the Hidden Markov Model includes a set of transition probabilities 112 associated with the transition vectors and a set of output probabilities 114 associated with the observed output at each state. The model is clocked from one state to another at regularly spaced, discrete intervals. At clock-time, the model may change from its current state to any state for which a transition vector exists. As illustrated, a transition can be from a given state back to itself.

The transition probabilities represent the likelihood that a transition from one state to another will occur when the model is clocked. Thus, as illustrated in FIG. 3, each transition has associated with it a probability value (between 0 and 1). The sum of all probabilities leaving any state equals 1. For illustration purposes, a set of exemplary transition probability values has been given in transition probability Table 112. It will be understood that in a working embodiment these values would be generated by the training data, with the constraint that the sum of all probabilities leaving any state equals 1.

Every time a transition is taken, the model can be thought of as emitting or outputting one member of its alphabet. In the embodiment illustrated in FIG. 3, a phoneme-based speech unit has been assumed. Thus the symbols identified in output probability Table 114 correspond to some of the phonemes found in standard English. Which member of the alphabet gets emitted upon each transition depends on the output probability value or function learned during training. The outputs emitted thus represent a sequence of observations (based on the training data) and each member of the alphabet has a probability of being emitted.

In modeling speech, it is common practice to treat the output as a sequence of continuous vectors as opposed to a sequence of discrete alphabet symbols. This requires the output probabilities to be expressed as continuous probability functions, as opposed to single numeric values. Thus HMMs are often based on probability functions comprising one or more Gaussian distributions. When a plurality of Gaussian functions are used they are typically additively mixed together to define a complex probability distribution, as illustrated at 116.

Whether represented as a single Gaussian function or a mixture of Gaussian functions, the probability distributions can be described by a plurality of parameters. Like the transition probability values (Table 112) these output probability parameters may comprise floating point numbers. Parameters Table 118 identifies the parameters typically used to represent probability density functions (pdf) based on observed data from the training speakers. As illustrated by the equation in FIG. 3 at Gaussian function 116, the probability density function for an observation vector O to be modeled is the iterative sum of the mixture coefficient for each mixture component multiplied by the Gaussian density N, where the Gaussian density has a mean vector uj and covariance matrix Uj computed from the cepstral or filter bank coefficient speech parameters.

The implementation details of a Hidden Markov Model recognizer may vary widely from one application to another. The HMM example shown in FIG. 3 is intended merely to illustrate how Hidden Markov Models are constructed, and is not intended as a limitation upon the scope of the present invention. In this regard, there are many variations on the Hidden Markov Modeling concept. As will be more fully understood from the description below, the eigenvoice adaptation technique of the invention can be readily adapted to work with each of the different Hidden Markov Model variations, as well as with other parameter-based speech modeling systems.

Constructing the Eigenvoice Space

Figure 4:
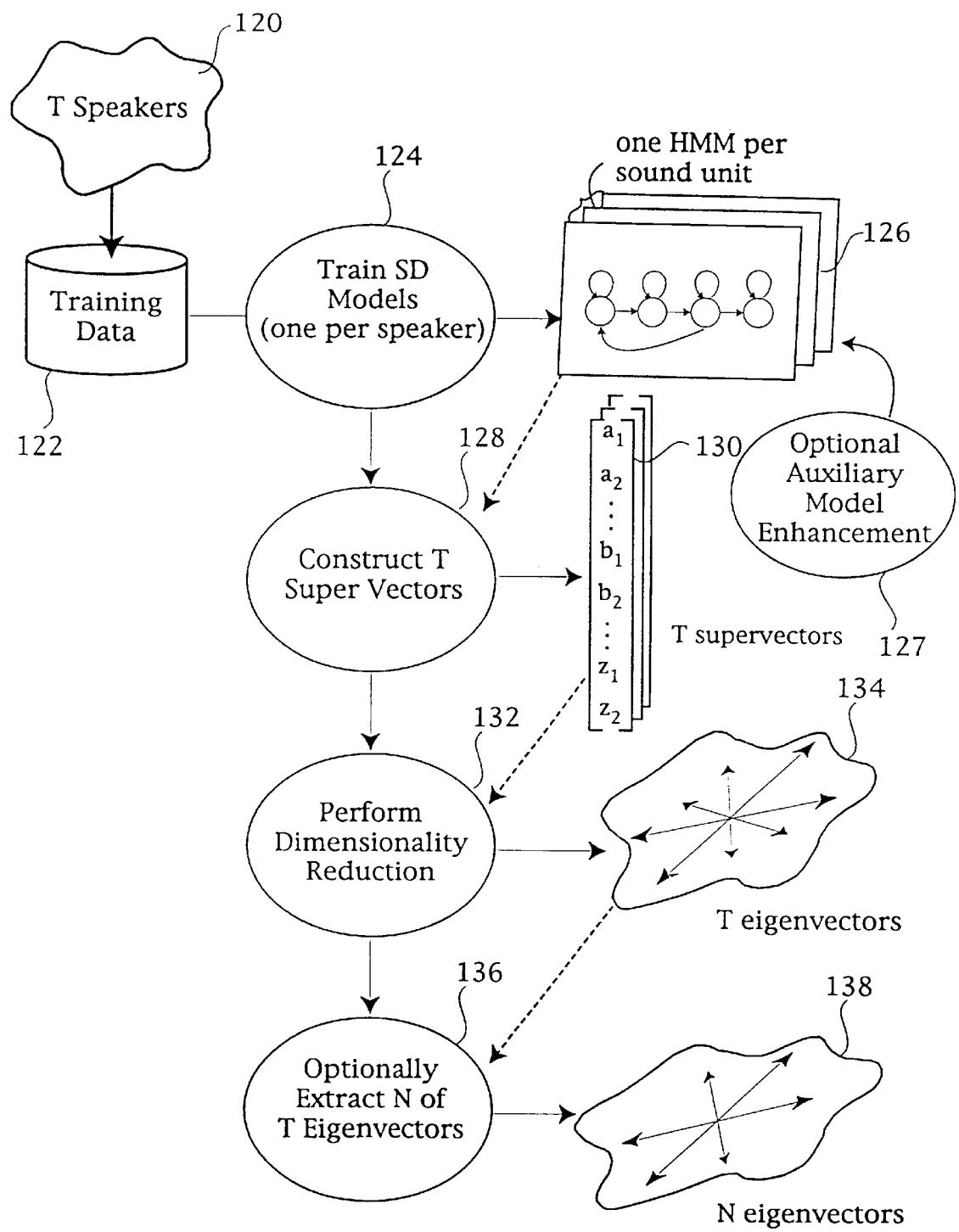
FIG. 4 is a data flow diagram illustrating how to construct an eigenspace from a plurality of training speakers.

The process for constructing an eigenspace to represent a plurality of training speakers is illustrated in FIG. 4. The illustration assumes a number T of training speakers 120 provide a corpus of training data 122 upon which the eigenspace will be constructed. Preferably, a reasonably large number of speakers (on the order of 100 to 200) provide the training data. These training data are then used to train a speaker dependent (SD) model as illustrated at 124. One model per speaker is constructed at step 124, with each model representing the entire inventory of sound units that is to be understood by the recognition system. In accordance with the description provided with FIG. 3, above, each model can be a set of HMMs, one HMM for each sound unit. This is illustrated in FIG. 4 at 126.

Superior results are achieved where the training set represents accurate speaker-dependent models. Therefore, if desired, the speaker-dependent models may be enhanced using auxiliary adaptation techniques. Such techniques include Maximum A Posteriori estimation (MAP) and other transformation-based approaches, such as Maximum Likelihood Linear Regression (MLLR). This optional auxiliary adaptation processing is illustrated in FIG. 4 at 127 Enhancing the speaker-dependent models in this way is particularly advantageous when constructing large vocabulary applications, where the amount of training data per parameter for a given speaker may be low.

After all training data from T speakers have been used to train the respective speaker dependent models, a set of T supervectors is constructed at 128. Thus there will be one supervector 130 for each of the T speakers. The supervector for each speaker comprises an ordered list of parameters (typically floating point numbers) corresponding to at least a portion of the parameters 118 of the Hidden Markov Models for that speaker. Parameters corresponding to the sound units are included in the supervector for a given speaker. The parameters may be organized in any convenient order. The order is not critical; however, once an order is adopted it must be followed for all T speakers.

The ordered Hidden Markov Model parameters are then concatenated to form the supervector. The choice of which HMM parameters to include in the supervector may depend on the available processing power. We have found that constructing supervectors from the Gaussian means gives good results. If greater processing power is available, the supervectors may also include other HMM parameters, such as the transition probabilities (Table 112, FIG. 1) or the Covariance matrix parameters (parameters 118, FIG. 1). Naturally, if the Hidden Markov Models generate discrete outputs (as opposed to probability densities) then these output values may be used to comprise the supervector.

After supervectors have been constructed for each of the training speakers, dimensionality reduction is performed at step 132. Dimensionality reduction is effected by mapping of high-dimensional space onto low-dimensional space. A variety of different techniques may be used to effect dimensionality reduction. These include Principal Component Analysis (PCA), Linear Discriminant Analysis (LDA), Factor Analysis (FA), Independent Component Analysis (ICA), Singular Value Decomposition (SVD) and other transformations that apply reduction criteria based on variance.

More specifically, the class of dimensionality reduction techniques useful in implementing the invention is defined as follows. Consider a set of T training supervectors obtained from speaker-dependent models for speech recognition. Let each of these supervectors have dimension V; thus, we can denote every supervector as $X=[x1, x2, \ldots, xV]^T$ (a V*1 vector). Consider a linear transformation M that can be applied to a supervector (i.e. to any vector of dimension V) to yield a new vector of dimension E (E is less than or equal to T, the number of training supervectors); each transformed vector can be denoted $W=[w1, w2, \ldots, wE]^T$. The values of the parameters of M are calculated in some way from the set of T training supervectors.

Thus, we have the linear transformation $W=M*X$. M has dimension E*V, and W has dimension E*1, where E<=T; for a particular set of T training supervectors, M will be constant. Several dimensionality reduction techniques may be used to calculate a linear transformation M from a set of T training supervectors such that W has dimension E<=T.

Examples include Principal Component Analysis, Independent Component Analysis, Linear Discriminant Analysis, Factor Analysis, and Singular Value Decomposition. The invention may be implemented with any such method (not only those listed) for finding such a constant linear transformation M in the special case where the input vectors are training supervectors derived from speaker-dependent modeling, and where M is used to carry out the aforementioned technique.

Dimensionality reduction upon T supervectors yields T eigenvectors, as at 134. Thus, if 120 training speakers have been used the system will generate 120 eigenvectors. These eigenvectors define what we call eigenvoice space or eigenspace.

The eigenvectors that make up the eigenvoice space contain different information; they each represent a different dimension across which different speakers may be differentiated. Each supervector in the original training set can be represented as a linear combination of these eigenvectors. The eigenvectors are ordered by their importance in modeling the data: the first eigenvector is more important than the second, which is more important than the third, and so on. Our experiments with this technique thus far show that the first eigenvector appears to correspond to a male-female dimension.

Although a maximum of T eigenvectors is produced at step 132, in practice, it is possible to discard several of these eigenvectors, keeping only the first N eigenvectors. Thus at step 136 we optionally extract N of the T eigenvectors to comprise a reduced parameter eigenspace at 138. The higher order eigenvectors can be discarded because they typically contain less important information with which to discriminate among speakers. Reducing the eigenvoice space to fewer than the total number of training speakers provides an inherent data compression that can be helpful when constructing practical systems with limited memory and processor resources.

Performing the Adaptation

Figure 5:
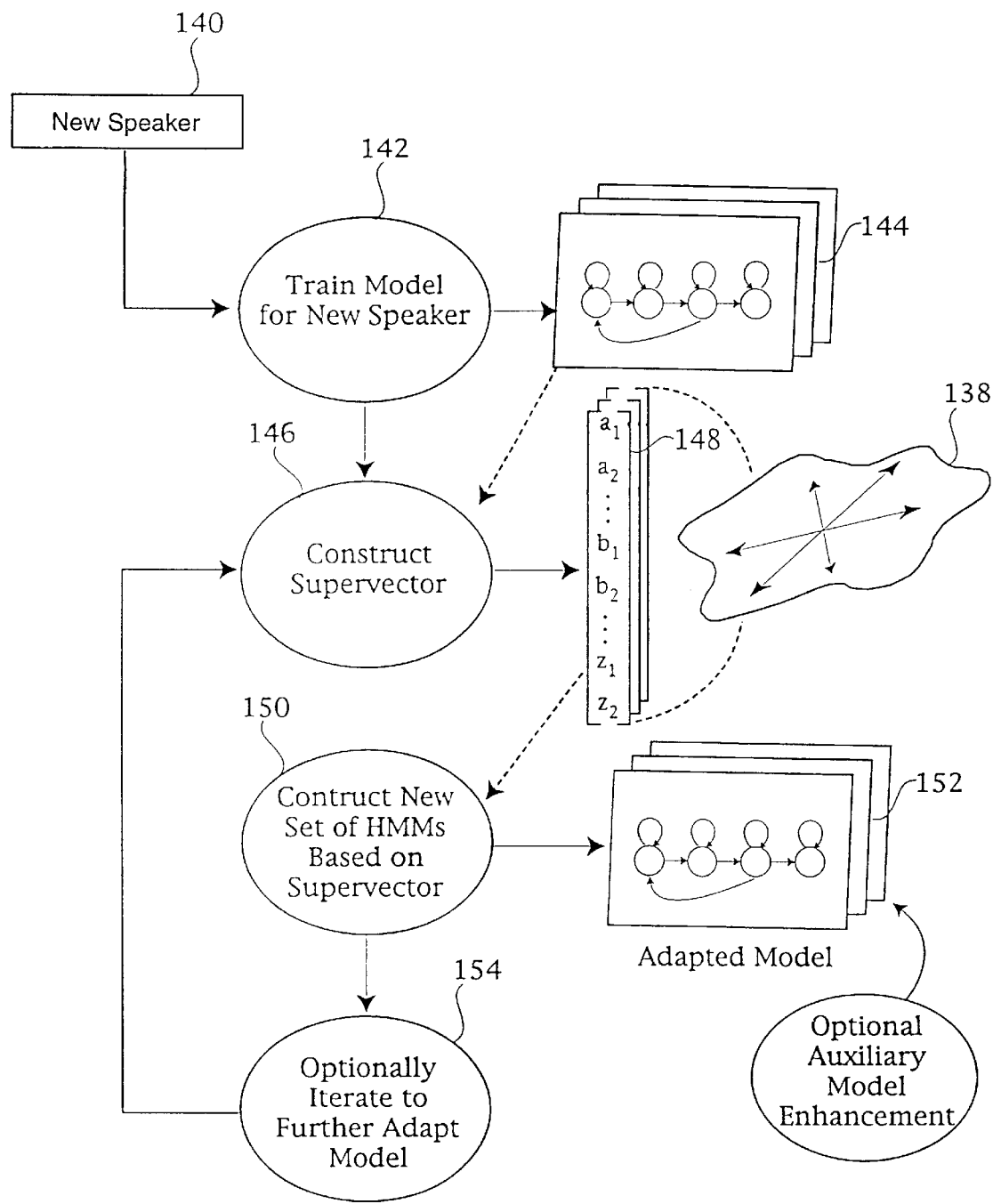
FIG. 5 is a data flow diagram illustrating how an adapted model is constructed using the eigenvoices in accordance with the invention.

Once the eigenvoice space has been constructed, speaker normalization, speaker adaptation or environment adaptation can be readily accomplished. While constructing the eigenspace is somewhat computationally intensive, and is typically conducted offline, adaptation is a comparatively simple computational operation that can be performed while the new speaker is using the system. Referring to FIG. 5, speech from new speaker 140 is used at step 142 to train a speaker dependent model to construct a set of HMMs 144 (one for each sound unit). The speaker dependent model can be trained in either a supervised mode, where the training system knows the content of the training speech in advance, or in an unsupervised mode, where the speech recognition system uses a speaker independent model to determine the content of the adaptation speech.

The speaker dependent model trained on this new speaker will usually be very inadequate for recognition, at least at first. However, the model may nevertheless be used to construct a supervector. The supervector is constructed at step 146 such that the supervector (supervector 148) is constrained to fall within the eigenvoice space 138 previously created from the training speakers. Supervector 148 is constructed with the imposed constraint that the HMM model used for recognition must be a linear combination of the eigenvoices comprising eigenvoice space 138.

The speaker dependent model 144 serves to estimate the linear combination of coefficients that will comprise the adapted model for that new speaker. Thus in step 150 a new set of HMMs is constructed based on supervector 148 to generate the adapted model 152. If desired, an optional iterative process may be performed at 154 to construct a new supervector from the adapted model 152 and thereafter to construct another set of HMMs from which a further adapted model may be constructed.

Figure 6:
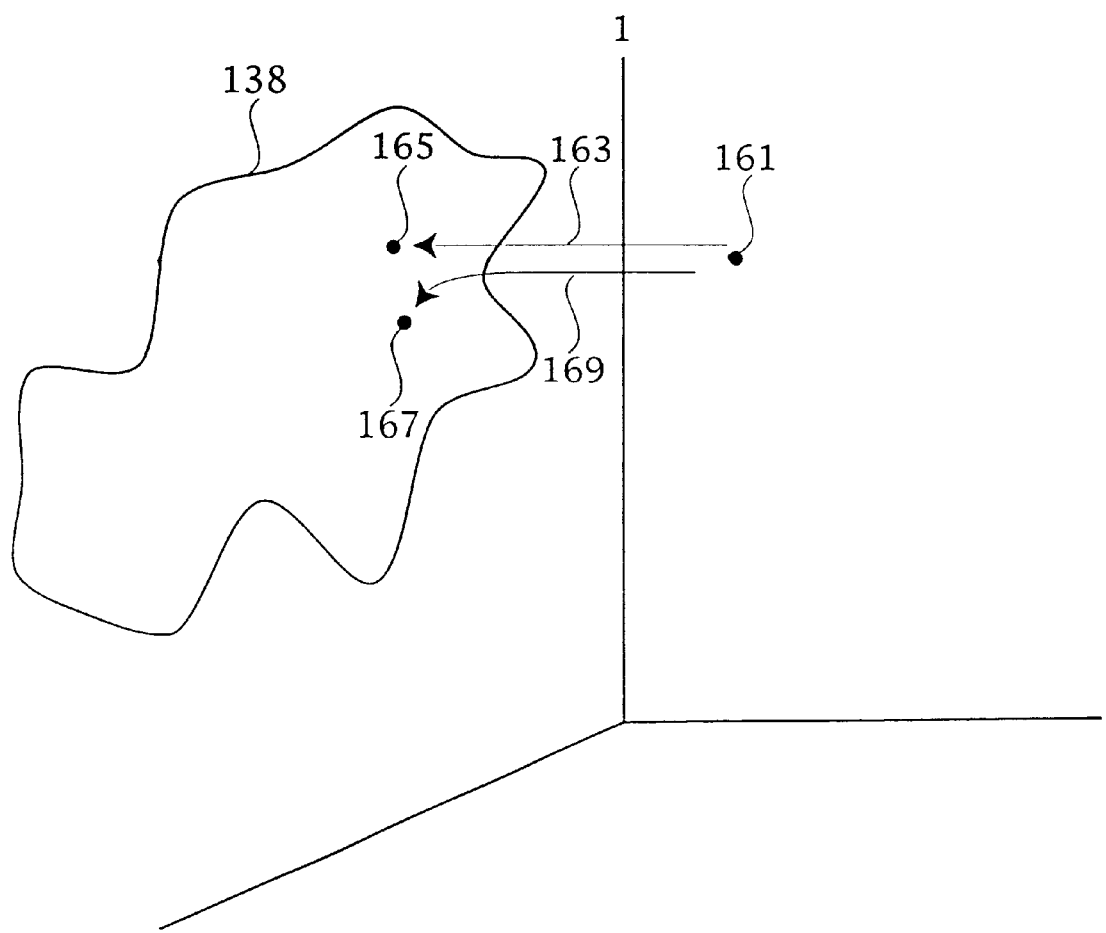
FIG. 6 is a simplified (two dimensional) illustration of eigenspace, comparing the projection operation with an alternate maximum likelihood placement technique.

FIG. 6 illustrates, in two dimensional space, the process by which the speech model of a new speaker is constrained within the eigenspace 138. As noted above, the eigenspace is a multi-dimensional space of order equal to the number of eigenvectors generated through dimensionality reduction.

Only two dimensions are illustrated in FIG. 6, to simplify the illustration, but it will be understood that eigenspace 138 is typically of much higher order than two.

The new speaker is shown diagrammatically by data point 161. Data point 161 would correspond to the supervector 148 shown in FIG. 5. Note that the new speaker at 161 lies outside eigenspace 138. As discussed above, the adaptation procedure involves finding a point within eigenspace that represents a good adapted model for this new speaker. The adapted model is based on the input speech uttered by the new speaker, but also constrained to be within eigenspace 138.

One simple technique for placing the new speaker within eigenspace is to use a simple projection operation illustrated by line 163. A projection operation finds the point within eigenspace that is as close as possible to the point outside of eigenspace corresponding to the new speaker's input speech. Thus the simple projection would place the new speaker at point 165 within eigenspace 138. It bears noting that these points are actually supervectors from which a set of HMMs can be reconstituted.

An alternate placement technique also illustrated in FIG. 6 involves a procedure that we call Maximum Likelihood Eigenvoice Decomposition (MLED) for placing the new vector into the space spanned by the eigenvoices. The maximum likelihood technique involves constructing a probability function based on the observation data from the new speaker and also based on the knowledge of how the Hidden Markov Models are constructed. Using this probability function, a maximum likelihood vector is obtained by taking derivatives and finding the local maxima. Point 167 corresponds to such a calculation. This maximum likelihood vector is thus inherently constrained within the space spanned by the eigenvoices and is a good representation within that space for the new speaker given the available input speech data.

Using the Speaker Identification or Speaker Verification System

The user seeking speaker identification or verification supplies new speech data at 144 and these data are used to train a speaker dependent model as indicated at step 146. The model 148 is then used at step 150 to construct a supervector 152. Note that the new speech data may not necessarily include an example of each sound unit. For instance, the new speech utterance may be too short to contain examples of all sound units. The system will handle this, as will be more fully explained below.

Dimensionality reduction is performed at step 154 upon the supervector 152, resulting in a new data point that can be represented in eigenspace as indicated at step 156 and illustrated at 158. In the illustration at 158 the previously acquired points in eigenspace (based on training speakers) are represented as dots, whereas the new speech data point is represented by a star.

Figure 7:
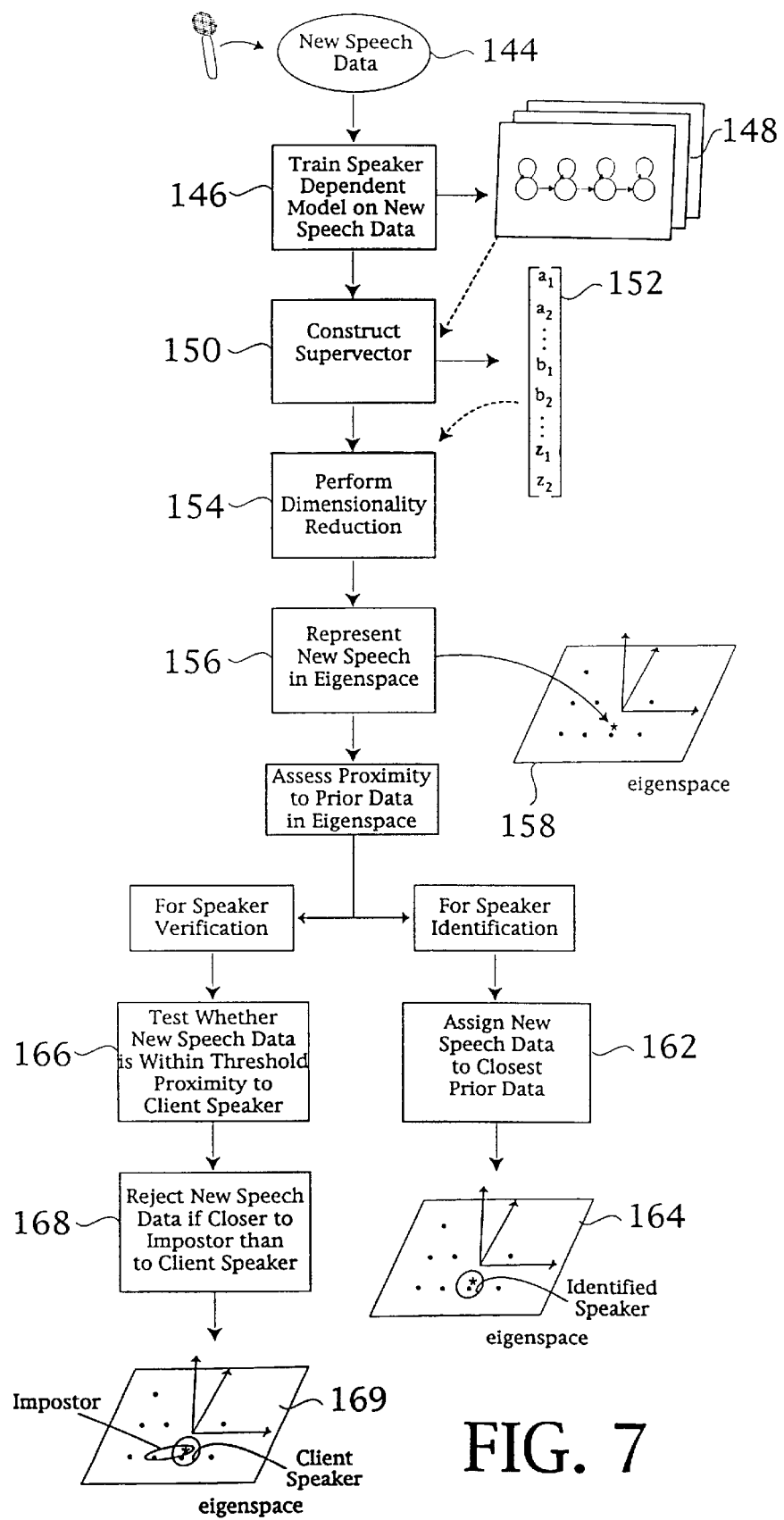
FIG. 7 is a flow diagram illustrating the process by which either speaker identification or speaker verification may be performed using the eigenspace developed during training.

Having placed the new data point in eigenspace, it may now be assessed with respect to its proximity to the other prior data points or data distributions corresponding to the training speakers. FIG. 7 illustrates an exemplary embodiment of both speaker identification and speaker verification.

For speaker identification, the new speech data is assigned to the closest training speaker in eigenspace, step 162 diagrammatically illustrated at 164. The system will thus identify the new speech as being that of the prior training speaker whose data point or data distribution lies closest to the new speech in eigenspace.

For speaker verification, the system tests the new data point at step 166 to determine whether it is within a predetermined threshold proximity to the client speaker in eigenspace. As a safeguard the system may, at step 168, reject the new speaker data if it lies closer in eigenspace to an impostor than to the client speaker. This is diagrammatically illustrated at 169, where the proximity to the client speaker and proximity to the closest impostor have been depicted.

What is claimed is:

1. An automated commerce system, comprising:
   a data store containing a representation of a priori knowledge about a speaker population;
   a transaction processor for effecting an electronic commerce operation;
   a speech recognizer employing a set of initial speech models for converting input speech from a user into words usable by said transaction processor; and
   model adaptation system that uses said input speech and said representation of speaker population to adapt said initial speech models and thereby create speaker dependent models specifically adapted for said user.

2. The system of claim 1 wherein said representation of a priori knowledge comprises a set of eigenvectors representing a speaker population.

3. The system of claim 1 further comprising dimensionality reduction processor for converting said input speech into eigenvectors.

4. The system of claim 1 wherein said representation of a priori knowledge comprises a set of eigenvectors representing a speaker population to define an eigenspace;
   wherein said system further comprises a dimensionality reduction processor for converting said input speech into user eigenvectors; and
   wherein said model adaptation system places said user eigenvectors into said eigenspace to adapt said initial speech models.

5. The system of claim 1 further comprising:
   a dimensionality reduction processor for converting said input speech into current speech eigenvectors;
   a user data store for storing user eigenvectors based on prior speech by said user; and
   a speaker verification module that compares said current speech eigenvectors with said user eigenvectors to provide verification of said user's identity.

6. The system of claim 5 wherein said transaction processor is configured to perform a predefined action based on verification of said user's identity.

7. The system of claim 6 wherein said predefined action includes inhibiting said electronic commerce operation if said user's identity is not verified.

8. The system of claim 1 further comprising:
   a dimensionality reduction processor for converting said input speech from a current speaker into current speech eigenvectors;
   a user data store for storing sets of user eigenvectors for a plurality of users, based on prior speech by said plurality of users; and
   a speaker identification module that compares said current speech eigenvectors with said sets of user eigenvectors to provide the identity of the current speaker.

9. The system of claim 8 wherein said transaction processor is configured to perform a predefined action based on verification of said user's identity.

10. The system of claim 1 further comprising speech synthesizer coupled to said transaction processor for supplying synthesized speech prompts to said user to effect said electronic commerce operation.

11. An automated commerce system, comprising:
    a data store containing a representation of a priori knowledge about the speech of a user;
    speaker verification system that uses said input speech and said representation of a priori knowledge to verify the identity of said user;
    a transaction processor responsive to said speaker verification system for effecting an electronic commerce operation; and
    a speech recognizer employing a speech model from which substantially all words in a given language can be built for converting input speech from a user into words usable by said transaction processor, said recognizer and said verification system cooperating to verify the identity of said user based on any input speech.

12. The system of claim 11 wherein said representation of a priori knowledge comprises a set of eigenvectors representing said user.

13. The system of claim 11 further comprising dimensionality reduction processor for converting said input speech into eigenvectors.

14. An automated commerce system, comprising:
    a data store containing a representation of a priori knowledge about the speech from a plurality of speakers including the speech of a current user;
    speaker identification system that uses said input speech and said representation of a priori knowledge to verify the identity of said user;
    a transaction processor responsive to said speaker verification system for effecting an electronic commerce operation; and
    a speech recognizer employing a speech model from which substantially all words in a given language can be built for converting input speech from a user into words usable by said transaction processor, said recognizer and said verification system cooperating to verify the identity of said user based on any input speech.

15. The system of claim 14 wherein said representation of a priori knowledge comprises a set of eigenvectors representing said user.

16. The system of claim 14 further comprising dimensionality reduction processor for converting said input speech into eigenvectors.

* * * * *